United States Patent
Berstis et al.

(10) Patent No.: US 6,650,894 B1
(45) Date of Patent: Nov. 18, 2003

(54) METHOD, SYSTEM AND PROGRAM FOR CONDITIONALLY CONTROLLING ELECTRONIC DEVICES

(75) Inventors: Viktors Berstis, Austin, TX (US); Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 09/583,644

(22) Filed: May 30, 2000

(51) Int. Cl.$^7$ .................................................. H04Q 7/20
(52) U.S. Cl. ..................... 455/420; 455/418; 455/419; 455/404.2; 455/405; 455/456.6
(58) Field of Search ................................. 455/405, 420, 455/418–419, 525, 518, 404.2; 340/539

(56) References Cited

U.S. PATENT DOCUMENTS

| | | | |
|---|---|---|---|
| 5,192,947 A | | 3/1993 | Neustein |
| 5,224,150 A | | 6/1993 | Neustein |
| 5,453,929 A | | 9/1995 | Stove |
| 5,541,572 A | | 7/1996 | Okamoto et al. |
| 5,815,407 A | | 9/1998 | Huffman et al. |
| 5,842,112 A | | 11/1998 | Fuller et al. |
| 5,887,258 A | | 3/1999 | Lemozit et al. |
| 5,907,613 A | | 5/1999 | Korn |
| 6,011,973 A | * | 1/2000 | Valentine et al. ............ 455/456 |
| 6,098,118 A | * | 8/2000 | Ellenby et al. ................. 710/8 |
| 6,343,213 B1 | * | 1/2002 | Steer ........................... 455/411 |
| 6,477,384 B2 | * | 11/2002 | Schroderus ................. 455/500 |

FOREIGN PATENT DOCUMENTS

| | | |
|---|---|---|
| CA | 2240647 | 1/1999 |
| EP | 0 891 110 A1 | 1/1999 |
| GB | 2334859 A | 9/1999 |
| WO | WO 00/74424 A1 | 12/2000 |

OTHER PUBLICATIONS

Sami Levijoki, "Privacy vs Location Awareness," Autumn 2000, see pages 1, 2, 6, 7 and 8; Helsinki University of Technology, Seminar on Network Security, www.slevijok@cc.hut.fi.

Karl Weiss and Dave Muri, "Conventional Local Area Radio Coverage System," Motorola, Inc., Technical Developments, vol. 13, Jul. 1991, pp. 67–69.

Brent Miller, IBM, Pervasive Computing, Bluetooth Applications in Pervasive Computing, Feb. 2000.

* cited by examiner

Primary Examiner—William Trost
Assistant Examiner—Brandon J Miller
(74) Attorney, Agent, or Firm—Marilyn Smith Dawkins; Bracewell & Patterson, L.L.P.

(57) ABSTRACT

In accordance with the present invention, an electronic device is enabled to detect the proximity of other electronic devices. Multiple proximity based conditions for usage of the electronic device may be provided by a manufacturer, user and other authorities at the electronic device. The proximity of other electronic devices is compared with the proximity based conditions and a level of usage of the electronic device is determined, such that the level of usage of the electronic device is conditionally adjusted according to the proximity of other electronic devices.

39 Claims, 3 Drawing Sheets

| Priority Level | Time Condition | Environment Condition | Device Condition | Usage Limitation |
|---|---|---|---|---|
| 1 | After 8:00:00 PM, before 7:00:00 AM | Any | CallerID = JoniJane | Audio on at volume level "5" Route call to phone |
| 2 | After 8:00:00 PM, before 7:00:00 AM | Within 50 ft. | Phone XY, Pager Z | Audio off Automatically route calls to voice mail Transmit control code 3425 |
| 3 | Any | Meeting Room A, B or C | More than 3 other electronic devices | Automatically switch to vibrate mode |
| 3 | Any | Within 10 ft. | More than 20 other phones | Automatically adjust to volume level "9" |
| 2 | After 7:00:00 AM, before 8:00:00 PM | Within 5 ft. | Computer AB | Automatically route calls to voice mail |
| 1 | Any | Within Building W | Control code 1254 | Audio off |
| 3 | After 7:00:00 AM, before 8:00:00 PM | Audio off | Any | Convert speech-to-text and transmit to glasses XJ5Y |
| 3 | Any | Light level = "2" | More than 4 other electronic devices | Backlight to level "2" |

METHOD, SYSTEM AND PROGRAM FOR CONDITIONALLY CONTROLLING ELECTRONIC DEVICES

BACKGROUND OF THE INVENTION

1. Technical Field

The present invention relates in general to electronic devices and, in particular, to selectively controlling electronic devices. Still more particularly, the present invention relates to conditionally controlling an electronic device according to conditional criteria designated at the electronic device by a manufacturer, user or authority to the user.

2. Description of the Related Art

Many electronic devices are available that provide users with messaging, telephony and processing. For example, electronic devices may include pervasive devices such as mobile telephones, pagers, wrist watches, personal digital assistants (PDAs) and others. In addition, electronic devices may encompass laptop computers, personal storage devices such as smart cards, compact disc players, radios, and other devices of which use may prove to be obtrusive or un-welcomed in particular areas.

In many cases, such electronic devices include audio transducers that alert a user to an incoming phone call, page or time. Such audible alerts can be helpful to a user, however they may also be obtrusive in certain environments such as a theater, classroom, hospital, etc. In addition, use of such electronic devices, and in particular use of mobile telephones, can be obtrusive in arenas such as an airplane.

Therefore, it has become desirable to include a control circuit within such electronic devices that may be utilized to control both audible alerts and usage of electronic devices. In particular, such control circuits are often designed such that the user does not have any control over conditions that cause audible alerts and usage of electronic devices to be inhibited.

For example, U.S. Pat. Nos. 5,192,947 and 5,224,150 provide that in public places or other controlled zones a localized transmitter can be utilized to disable all audio transducers included in all pagers able to detect an encoded signal transmitted by the localized transmitter within an immediate vicinity. In a particular example, a localized transmitter may emit an encoded signal within an auditorium such that if a person with a pager enabled to detect the encoded signal walks in to the auditorium, the pager's audio transducer is disabled. U.S. Pat. No. 5,842,112 provides an example where the localized transmitter is either an ultrasonic or infrared transmitter.

In another example, U.S. Pat. No. 5,815,407 provides for inhibiting operation of an electronic device within an airplane during take-off and landing. In particular, a sensor may be included within the electronic device that detects changes in lateral acceleration and inhibits of the electronic device if the detected lateral acceleration exceeds a particular threshold indicative of take-off or landing of an aircraft. In addition, a signal indicating take-off or landing of an aircraft may be transmitted within the aircraft, such that the electronic device detects the signal and automatically inhibits operation of the electronic device.

In yet another example, U.S. Pat. No. 5,907,613 provides a silencing system where a switch is electronically connected in series between a telephone line and a telephone receiver where in one position the telephone receiver is operational and in the other position the telephone receiver is disconnected from the telephone line. A remote button is provided that when pressed transmits a signal to the switch to change positions.

In the examples provided, the electronic devices are equipped with a control system that automatically inhibits the electronic device where the user is preferably not able to override the control system. In addition, in the examples provided, a transmitter sends a signal to the control system of the electronic device that inactivates the electronic device according to the type of signal. However, it would be advantageous to not only inhibit use of an electronic device when within a particular area, such as a theater, but to inhibit use of an electronic device dependent upon multiple types of conditions that may be specified by the user of the electronic device, or by another.

In addition, in view of the foregoing, it would be desirable to not only provide a control system for electronic devices that can receive control signals from a control tower and local transmitter, but also detect the presence of other electronic devices within a particular proximity and conditionally control a level of usage based on the proximity of other electronic devices. It would be desirable to allow a user or other to specify conditions for usage of an electronic device dependent upon the proximity of other electronic devices and other conditions such as time and environment.

SUMMARY OF THE INVENTION

In view of the foregoing, it is therefore an object of the present invention to provide an improved electronic device.

It is another object of the present invention to provide a method, system and program for selectively controlling electronic devices.

It is yet another object of the present invention to provide an improved method, system and program for conditionally controlling an electronic device according to conditional criteria designated at the electronic device by a manufacturer, user or authority to the user.

In accordance with the present invention, an electronic device is enabled to detect the proximity of other electronic devices. Multiple proximity based conditions for usage of the electronic device may be provided by a manufacturer, user and other authorities at the electronic device. The proximity of other electronic devices is compared with the proximity based conditions and a level of usage of the electronic device is determined, such that the level of usage of the electronic device is conditionally adjusted according to the proximity of other electronic devices.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The present invention may be executed in a variety of systems, including a variety of computing systems and electronic devices under a number of different operating systems. In a preferred embodiment of the present invention, the electronic device is a portable computing system such as a notebook computer, a palmtop computer, a personal digital assistant, such as IBM's WorkPad™ personal digital assistant, a telephone or other electronic computing system that may also incorporate communication features that provides for telephony, enhanced telephony, messaging and information services. However, the electronic device may also be, for example, a desktop computer, a network computer, a midrange computer or a mainframe computer. In addition, the electronic device may be a compact disc player, stereo, tape player, radio, television, or a camera. Preferably, in order to enable at least one of these communication features, the electronic device is able to be connected to a network. In addition, the electronic device may be a stand-alone system or part of a network such as a local-area network (LAN) or a wide-area network (WAN). Therefore, in general, the present invention may be executed in an electronic device that performs computing tasks such as manipulating data in storage that is accessible to the electronic device. In addition, the computer system may include at least one output device and at least one input device.

Figures 1, 2, 3, 4:
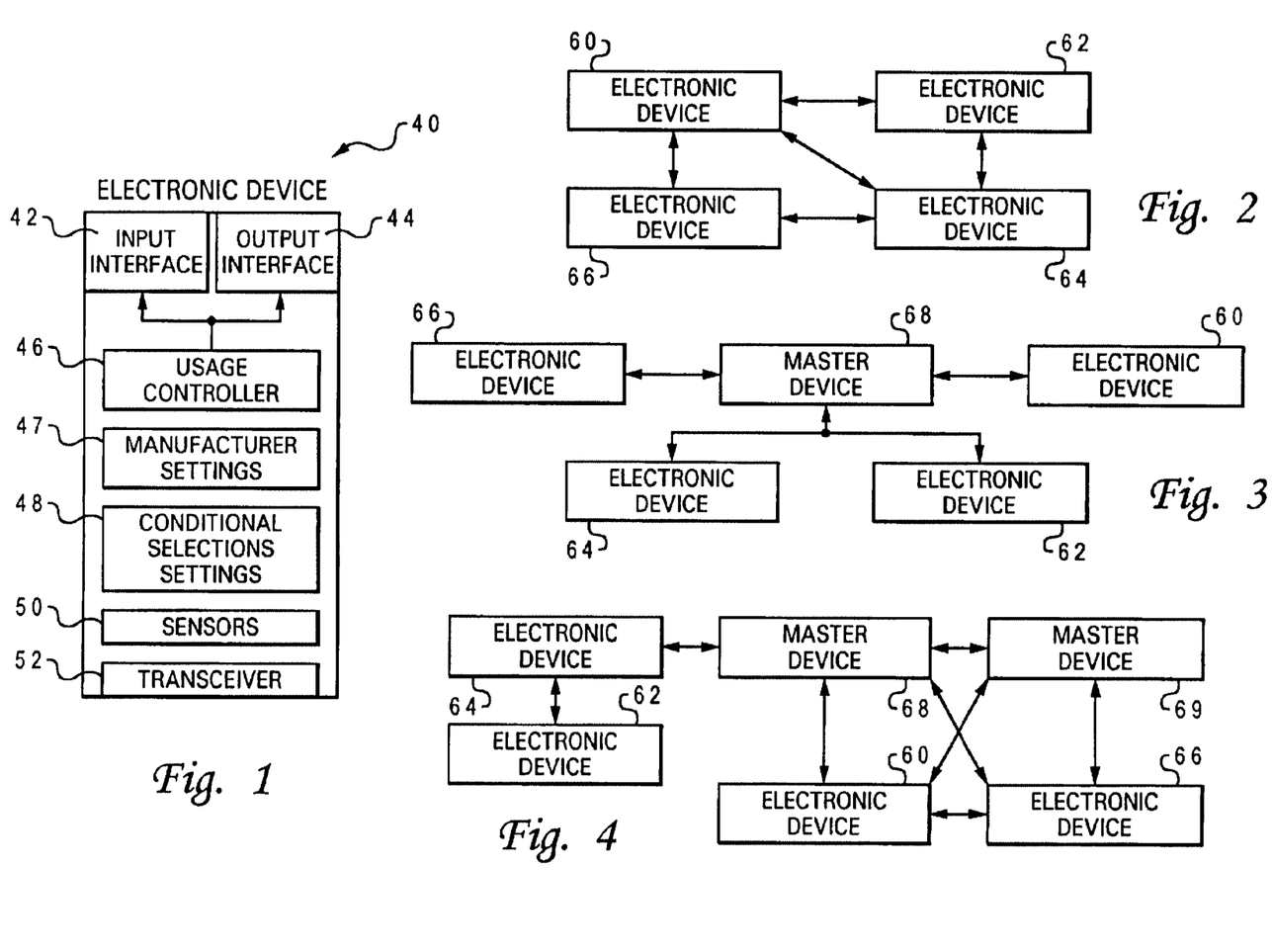
FIG. 1 illustrates a high level block diagram of one embodiment an electronic device in accordance with the method, system and program of the present invention.
FIG. 2 depicts a block diagram of a first embodiment of a system in which an electronic device may operate in accordance with the method, system and program of the present invention.
FIG. 3 illustrates a block diagram of a second embodiment of a system in which an electronic device may operate in accordance with the method, system and program of the present invention.
FIG. 4 depicts a block diagram of a third embodiment of a system in which an electronic device may operate in accordance with the method, system and program of the present invention.

Referring now to FIG. 1, there is depicted a high level block diagram of one embodiment an electronic device in accordance with the method, system and program of the present invention. As previously described, an electronic device 40 may include devices such as a computer system, a mobile telephone, a pager, an electronic watch, a compact disc player, a television, a stereo, a camera, a set of glasses with built-in display monitor, etc.

As depicted, electronic device 40 advantageously includes an input interface 42, an output interface 44, a usage controller 46, manufacturer settings 47, conditional selections settings 48, transceiver 50, and sensors 52. However, electronic device 40 is not limited to the components shown herein and preferably includes a is processor that during normal operation processes data under the control of operating system and application software stored in a random access memory (RAM) and Read Only Memory (ROM). The operating system preferably provides a graphical user interface (GUI) to the user.

Figure 6:
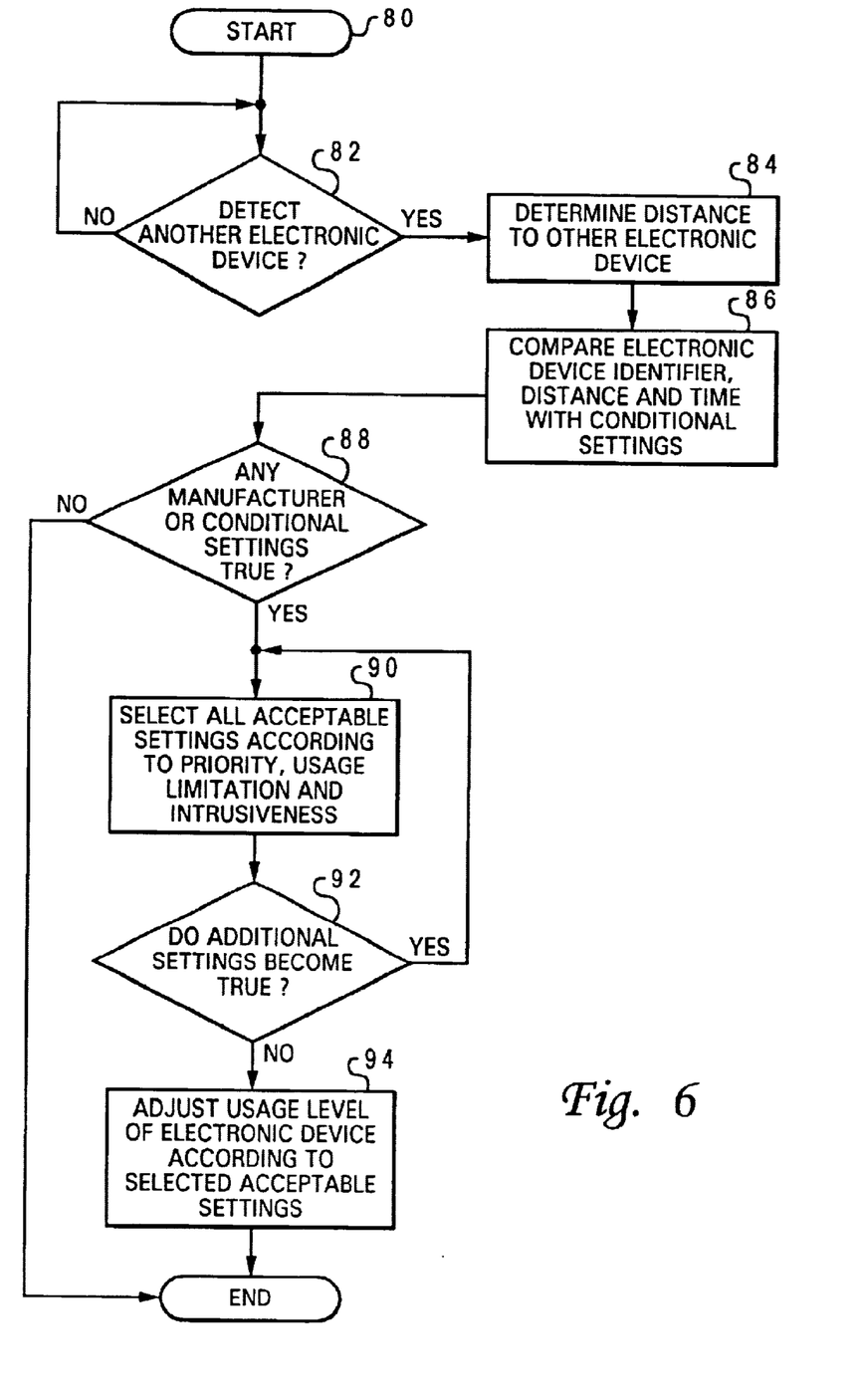
FIG. 6 depicts a high level logic flowchart of a process and program for conditionally controlling usage of an electronic device in relation to the proximity of other electronic devices.

Application software, such as usage controller 46, contains instructions that when executed on the processor carry out the instructions depicted in the flowchart of FIG. 6 described herein.

Input interface 42 may include devices including, but not limited to, a touchpad, buttons, a touch-sensitive interface, a keypad, a mouse, or a voice-recognition system. Usage controller 46 advantageously controls variable usage levels of input interface 42 according to current conditions. For example, usage controller 46 may completely disable input interface 42 when within a particular proximity of a particular computer system.

Output interface 44 may include device including, but not limited to, a touch-sensitive interface screen, a liquid-crystal display(LCD), an audio transducer, light emitting diodes (LEDs), a vibrating element or other output devices. Usage controller 46 advantageously controls variable usage levels of output interface 44 according to current conditions. For example, usage controller 46 may either increase or decrease the intensity of a backlighting element of an LCD or touchpad. In another example, usage controller 46 may either increase or decrease the volume of audio output and/or the type of audio output. In yet another example, usage controller 46 may shut off any output from output interface 44.

Manufacturer settings 47 may include settings that may be adjusted by a user and settings that may not be adjusted by a user. Usage controller 46 compares current conditions with manufacturer settings 47 to determine adjustments to input interface 42 and output interface 44.

In an example, in manufacturer settings 47 for a mobile phone or pager, a default audio selection and volume may be selected, where the user may select an alternate audio selection and volume to specialize usage.

In an alternate example, in manufacturer settings 47 for a mobile phone, pager or portable computer system, an automatic turn off control code may be programmed that when detected at the electronic device, automatically turns off any output from output interface 44. In this example, the user would preferably not be allowed to change the control code set in manufacturer settings 47. In particular, special control codes may be pre-assigned by manufacturers for police or other authorized agents, such as a school, to transmit within a particular area to restrict usage of electronic devices within the particular area. In particular, these control codes may be designated such that no other control code or selection by the user will allow the user to override the imposed usage limitation. In addition, special control codes may be pre-assigned that may be utilized by individuals or groups to transmit within a meeting room, theater, hospital, or other location where the individual or group would prefer that electronic devices be reduced to a particular level of usage.

Conditional selection settings 48 advantageously includes conditional settings selected by the user or an authority to the user on electronic device 40. Conditional selection settings 48 may include conditional settings dependent upon conditions including, but not limited to, time, environment and proximity of other electronic devices. Usage controller 46 compares current conditions with conditional selection settings 48 to determine adjustments to input interface 42 and output interface 44.

For example, a user may select a condition that between 8 PM and 7 AM when the user's spouse's mobile phone is detected within twenty-five ft. of the user's mobile phone, the user's mobile phone is to turn off output interface 44 and automatically route calls to voice mail. However, the user may amend the condition such that if a caller identification (caller ID) for the user's daughter is received, then that condition would override turning off output interface 44 and the call would be routed to the user's mobile phone with an audio output to alert the user.

An authority to a user that provides a user with electronic device 40 or who has authority over the user of electronic device 40 may also set conditional settings in conditional selections settings 48 that are preferably not adjustable by the user. Authorities to a user may include an employer, a parent, a teacher, or a temporary guardian, etc. For example, an employer may require that any mobile phones carried by employees while within the employer's building include a conditional setting for a particular control code that automatically turns off any audible output from the mobile phone while in the building unless a call is incoming from a selected set of caller IDs. In particular, the employer may provide a transceiver that transmits the particular control code throughout the building that when detected by any mobile phone with the conditional setting by the employer, turns off any audible output from those mobile phones unless a call is incoming from a selected set of caller IDs. In another example, the employer may provide a conditional setting control code that allows audible output at a particular volume from any mobile phone after normal work hours if the mobile phone is not within 20 ft. of any other mobile phone while inside the building.

In both manufacturer settings 47 and conditional selections settings 48, levels of priority may be set. For example, in manufacturer settings 47, a priority for following a control code set in manufacturer settings 47 to be utilized by police would have a high priority while a control code set in manufacturer settings 47 to be utilized by retailers would have a lower priority. Therefore, if both control codes were received at the same time at electronic device 40, the control code assigned to the police would override the control code assigned to the retailer.

In another example, in conditional selections settings 48, a user may select that a conditional selections setting to turn off audio output between 8 PM and 7 AM when within a particular proximity of another phone has higher priority over increasing the volume of audio output when the decibel level is detected above a particular level. Therefore, if both conditional selections settings were true at electronic device 40, the audio output would remain off.

In some cases, multiple settings may be true, whether in manufacturer settings 47 or conditional selection settings 48, where each of the multiple settings is adjusting a different type of usage level.

In these cases, it would be advantageous for usage controller 46 to adjust input interface 42, output interface 44 and other controls according to multiple settings. For example, if one setting with a priority of "1" adjusts the level of the backlighting element while another settings with a priority of "2" adjusts the level of audio output, and both are true, both settings would advantageously be utilized to control the usage level of electronic device 40.

In addition, the manufacturer and user may assign overall levels of intrusiveness associated with various types and levels of output from electronic device 40. When there are conflicting settings that both address a single type of usage limitation, the setting that leads to the least amount of intrusiveness by electronic device 40 is advantageously selected. For example, in manufacturer settings 47, the loudest level of audio output from an audio transducer may be rated as the most intrusive while no audio output from the audio transducer would be rated as the least intrusive. In another example, a user may set in conditional selections settings 48 that a blinking LED to indicate an incoming call is less intrusive than an audio output or vibration mode.

Transceiver 50 provides for transmission and reception of signals at electronic device 40 via a communication medium. Transceiver 50 advantageously transmits an identifier for electronic device 40 with all transmissions. For example, an identifier may include a description of the type of electronic device, maker and a unique identification for the particular electronic device. In addition, a personal identification of the user or owner of the electronic device may be included with the identifier for electronic device 40.

In addition to transmitting an identifier, transceiver 50 of electronic device 40 is also preferably enabled to transmit control codes to other electronic devices. For example, a parents' electronic device may transmit a control code to a child's electronic device that may, for example, specify to reduce the volume of output from the output interface of the child's electronic device when the child's electronic device is within a particular proximity of the parent's electronic device. The parent may advantageously include the control code in a secured conditional selection setting on the child's electronic device and then also include the control code in as a conditional selection setting on the parent's electronic device.

In addition, transceiver 50 may advantageously include a global positioning system (GPS) such that the position of electronic device 40 is passively detected at transceiver 50 and may then be transmitted to other electronic devices and master devices or compared with positions of other electronic devices received via transceiver 50.

Advantageously, a user may also shield transmission of an identifier and/or location by transceiver 50 when detected at particular locations by the GPS that are set within manufacturer settings 47 and/or conditional selections settings. For example, manufacturer settings 47 may designate that transceiver 50 may not transmit an identifier and location when within particular government secured areas or other areas. A user may designate that transceiver 50 may not transmit an identifier and location when the user is within their home.

In particular, it is advantageous to utilize an infrared (IR) or ultrasound enabled transceiver 50. IR and ultrasound offer an inexpensive solution and are able to broadcast through clothing or other boundaries. However, in alternate embodiments, additional types of transmission media may be utilized, such as radiofrequency (RF).

It would be advantageous to utilize a particular data transmission protocol for broadcasts to and from transceiver 50, such as Bluetooth™, whereby electronic devices that are within a particular local area can communicate wirelessly without a network connection. However, multiple diverse data transmission protocols may also be utilized where transceiver 50 is equipped to transcode multiple diverse data transmission protocols into a protocol utilized by electronic device 40. In addition, it would be advantageous to utilize a particular data transmission format, such as extensible markup language (XML) and others via transceiver 50.

Moreover, it would be advantageous to exchange data with other electronic devices via transceiver 50 about a current usage level status of electronic device 40 and settings from conditional selections settings 48. In particular, it would be preferable for electronic device 40 to query the current configuration and usage level of a particular other electronic device or a group of other electronic devices, store the current configuration and level of usage of other electronic device(s) and perhaps adopt the current configuration and level of usage into conditional selections settings 48.

Sensors 52 may include multiple diverse types of sensors including, but not limited to, humidity sensors, light sensors, sound sensors, motion sensors, altitude sensors, etc. Settings in manufacturer settings 47 or conditional selections settings 48 may include conditions dependent upon sensed input from sensors 52. For example, a sound sensor may determine a sound level in decibels that is compared with conditional sound level settings. Usage controller 46 compares current sensed conditions with manufacturer settings 47 and conditional selections settings 48 to determine adjustments to input interface 42 and output interface 44.

With reference now to FIG. 2, there is illustrated a block diagram of a first embodiment of a system in which an electronic device may operate in accordance with the method, system and program of the present invention. In the present embodiment, each of electronic devices 60, 62, 64, and 66 are enabled to directly communicate with one another according to a range of transmission provided at each electronic device. The transceivers for each of electronic devices 60, 62, 64, and 66 may vary in range of transmission and reception.

Each of electronic devices 60, 62, 64, and 66 are preferably enabled to detect at least a relative distance between one another, and may also be advantageously equipped to detect a precise distance and location between one another.

In a first example, electronic device 60 may transmit an identifier for electronic device 60, where any of electronic devices 62, 64 or 66 detecting the transmission are enabled to determine a range of distance and device identification, but not a precise location from which the transmission from electronic device 60 is made.

In a second example, electronic device 60 may passively detect its location and transmit location and an identifier. When any of electronic devices 62, 64 or 66 are within a proximity of the transmission range of electronic device 60, the location and identifier are detected. If, for example, electronic device 62 detects the transmission from electronic device 60, electronic device 62 would compare the location of electronic device 62 with the transmitted locations of electronic device 60 and determine the exact distance and difference in location between the two devices.

Referring now to FIG. 3, there is depicted a block diagram of a second embodiment of a system in which an electronic device may operate in accordance with the method, system and program of the present invention. In the present embodiment, each of electronic devices 60, 62, 64, and 66 are enabled to directly communicate with a master device 68 according to a range of transmission. Master device 68 may include control systems with at least one local transceiver that is enabled to transmit and receive. In addition, master device 68 may include control systems with at least one remote transceiver, such as a cellular transmission tower, that is enabled to transmit and receive.

In the present embodiment, master device 68 may advantageously include conditional selection settings for each of multiple users. For example, for a master device 68 that includes a cellular tower, a control center for the cellular tower may include conditional selection settings for users with authorized electronic devices that may communicate with the cellular tower. Therefore, master device 68 would determine what conditional selection settings are currently enabled and transmit a control code to control the type of usage limitation indicated by the conditional selection setting to the appropriate electronic device.

For example, if a conditional setting for the user of electronic device 60 includes turning off the output interface if electronic device 62 is detected within 25 ft. of electronic device 60 and master device 68 determines that electronic device 62 is currently within 25 ft. of electronic device 60, master device 68 may transmit a control code to automatically turn off the output interface of electronic device 60.

In addition, in the present embodiment, each of electronic devices 60, 62, 64, and 66 advantageously communicates via master device 68. In one example, master device 68 detects when each of electronic devices 60, 62, 64, and 66 are within a particular proximity of one another and transmit a location and identifier for each electronic device to the other electronic devices. In addition, master device 68 may also determine the distances between electronic devices and transmit the distance with the identifier.

Moreover, master device 68 may include conditional settings independent of any one user or electronic device. For example, master device 68 may include a conditional selection that when more than three electronic devices are detected within a particular room, each device is to receive a control code to turn off audible sound from master device 68. Therefore, the environment provided by master device 68 may react according to the electronic devices in the environment.

With reference now to FIG. 4, there is illustrated a block diagram of a third embodiment of a system in which an electronic device may operate in accordance with the method, system and program of the present invention. In the example, each of electronic devices 60, 64, and 66 are enabled to directly communicate with master device 68 and each of electronic devices 60 and 66 are enabled to directly communicate with master device 69 according to a range of transmission. In addition, in the example, electronic devices 60 and 66 are enabled to directly communicate and master devices 68 and 69 are enabled to directly communicate.

In an example of the present embodiment, electronic device 62 may represent a portable computer system that is enabled to transmit and receive within a local area. Electronic device 64 represents a mobile telephone that is enabled to transmit and receive within a local area and with master device 68 that may be local or remote. A user may designate in conditional selections settings, at electronic device 64(the mobile telephone), for example, that whenever the user's electronic device 62(the portable computer system) is operational and detected with a particular range of the mobile telephone, the mobile telephone is to switch to a higher ring volume in order to sufficiently distract the user from working on the portable computer system for an incoming call. Therefore, electronic devices may only transmit and receive in a local area with other electronic devices within the local area, or may be enabled to transmit and receive in a local area with other electronic devices and master devices.

In another example, master device 68 may monitor electronic devices locally within a particular meeting area. A conditional setting at master device 68 may indicate that when more than five electronic device that are mobile telephones and/or pagers are detected within the meeting area, all electronic devices within the meeting area are to receive a control code to turn off any audible output and route all calls to voice mail. In addition, master device 68 may be coupled with a light sensor in the meeting room that detects when the lights are turned down for a presentation. Electronic device 68 may include a conditional setting that when the lights are dimmed in the meeting area, all electronic devices within the meeting area are to receive a control code to turn off any backlighting elements.

Electronic device 66, for example, may be carried by a user into the meeting room. A conditional setting at electronic device 66 may require that when a manager's electronic device 60 is detected, electronic device 66 reduces audio output to a lower volume. If the user is in the meeting room carrying electronic device 66 where two other electronic devices are present and the user's manager enters with his/her electronic device 60, the volume is automatically lowered in electronic device 66. When additional employees enter the room with phones/pagers and master device 68 detects more than five phones/pagers, master device 68 then transmits a control code to turn off all audio and route any calls to voice mail on all electronic devices in the meeting room.

Electronic devices 60 and 66 may also receive control codes and other communications from master device 69. In the previously described example, master device 68 transmits and receives locally. For purposes of the present example, master device 69 transmits and receives remotely, such as a cellular transmission tower. While electronic device 60 may receive a control code to turn off all audio from master device 68, electronic device 60 may also receive a control code from master device 69 to switch to a vibrate mode and receive an incoming emergency phone call. In particular, master device 69 may include a selected set of caller ID's that when detected for the user are transmitted with a control code to override any locally imposed control codes.

Figure 5:
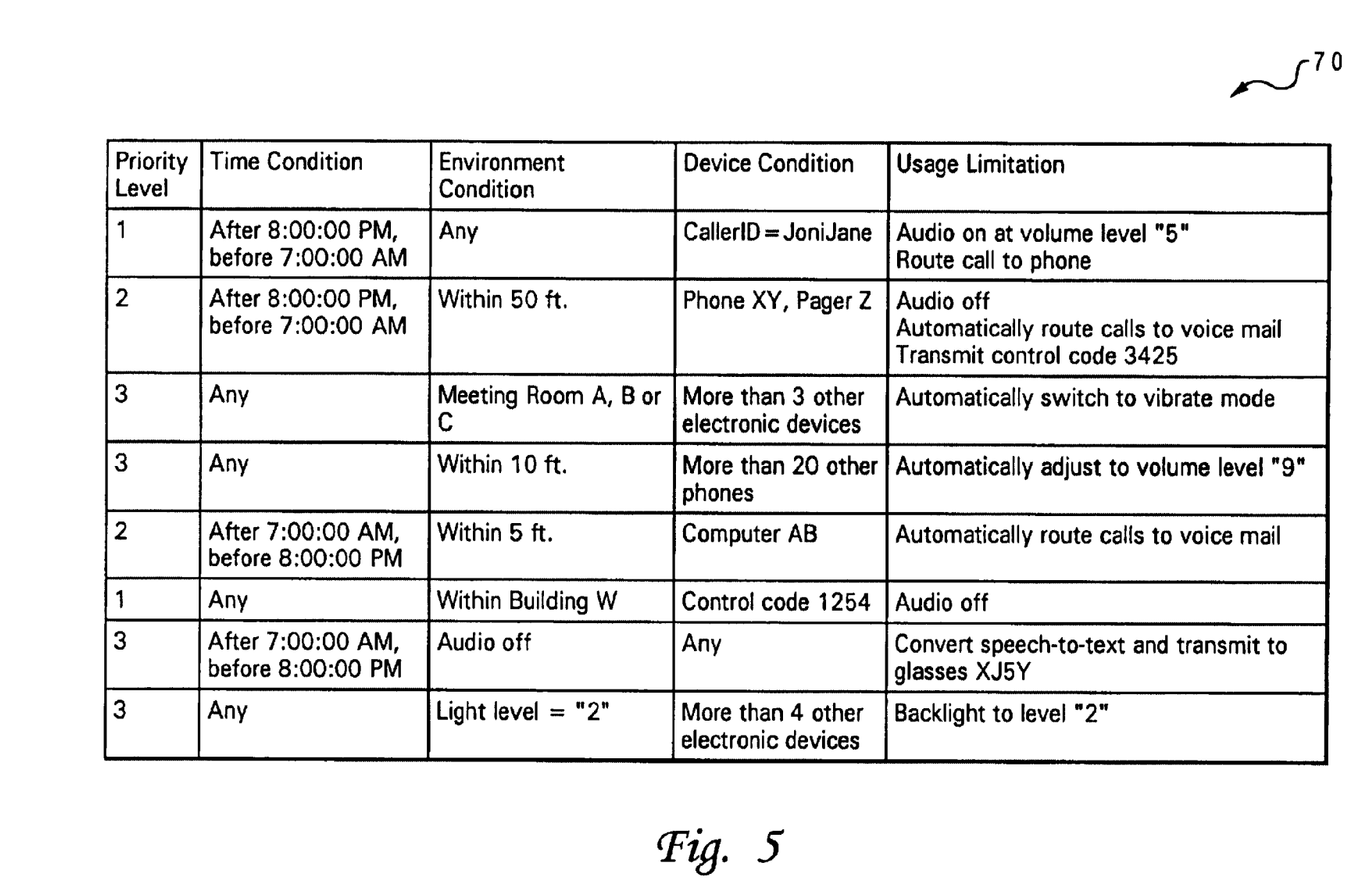
FIG. 5 illustrates a pictorial chart of conditional selections settings for an electronic device in accordance with the method, system and program of the present invention.

Referring now to FIG. 5, there is illustrated a pictorial chart 70 of conditional selections settings for an electronic device in accordance with the method, system and program of the present invention. Each conditional selections setting may include, but is not limited to including, a time condition, environment condition and device condition. In addition, each conditional selections setting indicates a usage limitation of the electronic device if all the conditions are met.

A user may designate a priority associated with each selection, where the highest priority setting is selected in the case of more than one conditional selection setting being true and designated to adjust the same usage limitation. In the present example, a priority level of "1" designates the highest priority. However, entries within the manufacturer settings, such as a police or other authorized agency control code, would preferably override any conditional selections settings by the user.

In the example, the second entry is advantageous for a family where it may be preferred that any electronic devices carried by the family remain inaudible during certain hours if the family members are within a particular proximity of one another. For example, between the hours of 8 PM and 7 AM, if phone XY or pager Z is detected within 50 feet of the particular phone, the audio is turned off and the phone switches to voice mail. In addition, usage limitations may include settings to transmit a control code to the devices phone XY and pager Z in order to inhibit usage of those devices to a similar level of usage. In the example, a control code "3425" to turn audio off and switch to voice mail is transmitted to phone XY and pager Z, where phone XY and pager Z each include a condition to turn audio off and switch to voice mail upon receiving control code "3425".

However, in the example, the first entry overrides the second entry if true. According to the first entry which has a higher priority than the second entry, if a call with a caller ID of "JoniJane" is received from anywhere during the hours of 8 PM to 7 AM, the phone receiving the call turns audio on at level "5" and routes the call to the phone. It would be advantageous for an electronic device to include a default caller ID and for the user to be able to define a caller ID at the electronic device via entry by a touchpad, voice recognition, smart card, or other input device. Therefore, the daughter of the user with the caller ID of "JoniJane" may enter her caller ID at any electronic device and the call would automatically be routed to the user's phone according to the conditional setting.

In a third conditional setting entry, the electronic device is set such that if within meeting room A, B or C and more than three other electronic devices are detected, the electronic device automatically switches to vibrate mode. Such a setting may be particularly useful in an office building where each room may have a transceiver that transmits an identifier for the room that can be included in the conditional setting, or a GPS location for the room may be included in the conditional setting. Thereby, the user would not have to adjust the output setting of the electronic device within the building.

In a fourth conditional setting entry, the electronic device is set such that if within ten feet of more than twenty other phones, the volume of audible output from the electronic device is automatically increased to a volume "9".

In a fifth conditional setting entry, the electronic device is set such that if within five feet of computer AB between the hours of 7 AM and 8 PM, the electronic device automatically routes calls to voice mail. In particular, a user who wants to be undisturbed by an incoming phone call may designate that when within a particular proximity of their computer, the user would not be disturbed.

In a sixth conditional setting entry, the electronic device is set such that if within building W and control code "1254" is detected as output within building W, then the audio is turned off. In particular, as previously described, an employer may require that any personal electronic devices carried into the building receive a conditional setting that designates a particular control code and usage limitation.

In a seventh conditional setting entry, the electronic device is set such that between the hours of 7 AM and 8 PM if an "audio off" usage limitation setting is detected, a built-in speech-to-text converter converts any incoming audio into text and wirelessly transmits the text to the user's glasses that have a built-in display monitor. In this case, both the condition to turn audio off in building W when control code "1254" is received and the condition to convert text-to-speech and transmit to the user's glasses may both. determine the level of usage of the electronic device. Advantageously, each usage limitation has an associated internal control code that is automatically transmitted within the electronic device when selected. Therefore, selection of one usage limitation may trigger another conditional setting.

In an eighth conditional setting entry, the electronic device is set such that if the ambient light around the electronic device is at a level of "2", which is low light, and there are more than four electronic devices detected, the backlighting is adjusted to a level of "2", which is a low backlighting level. This type of example might be advantageous in a situation where a user works in a dimly lit room with at least four other electronic devices and does not want the backlighting from the present electronic device to be intrusive.

With reference now to FIG. 6, there is depicted a high level logic flowchart of a process and program for conditionally controlling usage of an electronic device in relation to the proximity of other electronic devices. As illustrated, the process starts at block 80 and thereafter proceeds to block 82. Block 82 depicts a determination as to whether or not another electronic device is detected. In detecting another electronic device, signals including, but not limited to, a control code, identifier or caller ID may be received. If another electronic device is not detected, then the process iterates at block 82. If another electronic device is detected, then the process passes to block 84. Block 84 illustrates determining the distance between and/or location of the other electronic device. Next, block 86 depicts comparing the other electronic device indicator, distance and time with the conditional selection settings. Thereafter, the process passes to block 88.

Block 88 illustrates a determination as to whether or not any manufacturer settings and/or conditional selection settings are true. If no settings are true, then the process ends. If at least one conditional selection setting is true, then the process passes to block 90.

Block 90 depicts selecting all acceptable settings according to priority, usage limitation and intrusiveness. Next, block 92 illustrates a determination as to whether or not additional settings become true as a result of selecting all acceptable settings. In particular, as a result of selecting all acceptable settings, internal control codes representative of usage limitations are transmitted and additional settings may become true as a result of transmitting the internal control codes. If additional settings become true, then the process passes to block 90. If additional settings do not become true, then the process passes to block 94. Block 94 depicts adjusting the usage level of the electronic device according to the selected acceptable settings; and the process ends.

It is important to note that, although the present invention has been described in the context of a fully functional electronic device, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for conditionally controlling an electronic device, said method comprising the steps of:
    a particular mobile electronic device directly detecting signals transmitted by an alternate mobile electronic device within a particular proximity of the particular mobile electronic device, said step of detecting including:
        detecting an identifier and global positioning location by receiving a signal directly from said alternate mobile electronic device at said particular mobile electronic device; and
        computing said particular proximity of said global positioning location of said alternate mobile electronic device to a current global positioning location of said particular mobile electronic device; and
    in response to said detecting said signals, adjusting a level of usage of said particular mobile electronic device in response to determining a particular conditional usage level selection according to said particular proximity of said alternate mobile electronic device from among a plurality of conditional usage level selections at said particular mobile electronic device, such that said level of usage of said particular mobile electronic device is conditionally adjusted according to said particular proximity of said alternate mobile electronic device.

2. The method for conditionally controlling an electronic device according to claim 1, said step of adjusting a level of usage of said particular mobile electronic device in response to determining a particular conditional usage level selection according to said particular proximity of said alternate mobile electronic device, further comprising the step of:
    comparing said particular proximity of said alternate mobile electronic device with said plurality of conditional usage level selections at said particular mobile electronic device.

3. The method for conditionally controlling an electronic device according to claim 2, wherein each of said plurality of conditional usage level selections has an associated priority, said method further comprising the steps of:
    determining which of said detected at least one of said plurality of conditional usage level selections is rated with a highest priority, in response to detecting a match of at least one of said plurality of conditional usage level selections according to said particular proximity; and
    adjusting said level of usage of said particular mobile electronic device according to said conditional usage level selection rated with said highest priority.

4. The method for conditionally controlling an electronic device according to claim 2, said method further comprising the step of:
    adjusting said level of usage of said particular mobile electronic device according to said one of said plurality of conditional usage level selections, in response to detecting a match of one of said plurality of conditional usage level selections according to said particular proximity.

5. The method for conditionally controlling an electronic device according to claim 2, said method further comprising the step of:
    maintaining said usage level in response to detecting any control codes that override any conditional usage level settings matched according to said particular proximity of said alternate mobile electronic device.

6. The method for conditionally controlling an electronic device according to claim 2, said method further comprising the step of:
    determining if any of said plurality of conditional usage level selections match according to said particular proximity of said alternate mobile electronic device and according to an identifier for said alternate mobile electronic device.

7. The method for conditionally controlling an electronic device according to claim 2, said method further comprising the step of:
    determining if any of said plurality of conditional usage level selections match according to said particular proximity of said alternate mobile electronic device and a current time.

8. The method for conditionally controlling an electronic device according to claim 2, said method further comprising the step of:
    comparing said particular proximity of said alternate mobile electronic device with said plurality of conditional usage level selections set by a manufacturer at said particular mobile electronic device.

9. The method for conditionally controlling an electronic device according to claim 2, said method further comprising the step of:

comparing said particular proximity of said alternate mobile electronic device with said plurality of conditional usage level selections set by a user at said particular mobile electronic device.

10. The method for conditionally controlling an electronic device according to claim 2, said method further comprising the step of:
comparing said particular proximity of said alternate mobile electronic device with said plurality of conditional usage level selections set by an authority to a user of said particular mobile electronic device.

11. The method for conditionally controlling an electronic device according to claim 1, said method farther comprising the steps of:
receiving a control code at said particular mobile electronic device from said alternate mobile electronic device;
comparing said control code with said plurality of conditional usage level settings; and
adjusting said level of usage of said particular mobile electronic device according to one of said plurality of conditional usage level settings that matches said control code.

12. The method for conditionally controlling an electronic device according to claim 1, said method further comprising the step of:
transmitting a control code from said particular mobile electronic device to said alternate mobile electronic device, in response to adjusting said usage level of said particular mobile electronic devices according to one of said plurality of conditional usage level settings.

13. A system for conditionally controlling an electronic device, said system comprising.
a transceiver on a particular mobile electronic device for directly detecting signals transmitted by an alternate mobile electronic device within a particular proximity of the particular mobile electronic device, said transceiver including means for detecting an identifier and global positioning location by receiving a signal directly from said alternate mobile electronic device at said particular mobile electronic device;
means for computing said particular proximity of said global positioning location of said alternate mobile electronic device to a current global positioning location of said particular mobile electronic device; and
means, responsive to detection of said signals, for adjusting a level of usage of said particular mobile electronic device in response to determining a particular conditional usage level selection according to said particular proximity of said alternate mobile electronic device from among a plurality of conditional usage level selections at said particular mobile electronic device, such that said level of usage of said particular mobile electronic device is conditionally adjusted according to said particular proximity of said alternate mobile electronic device.

14. The system for conditionally controlling an electronic device according to claim 13, said means for adjusting a level of usage of said particular mobile electronic device in response to determining a particular conditional usage level selection according to said particular proximity of said alternate mobile electronic device, further comprising:
means for comparing said particular proximity of said alternate mobile electronic device with said plurality of conditional usage level selections at said particular mobile electronic device.

15. The system for conditionally controlling an electronic device according to claim 14, said system further comprising:
means for determining which of said detected at least one of said plurality of conditional usage level selections is rated with a highest priority, in response to detecting a match of at least one of said plurality of conditional usage level selections according to said particular proximity; and
means for adjusting said level of usage of said particular mobile electronic device according to said conditional usage level selection rated with said highest priority.

16. The system for conditionally controlling an electronic device according to claim 14, said system further comprising:
means for adjusting said level of usage of said particular mobile electronic device according to said one of said plurality of conditional usage level selections, in response to detecting a match of one of said plurality of conditional usage level selections according to said particular proximity.

17. The system for conditionally controlling an electronic device according to claim 14, said system further comprising:
means for maintaining said usage level in response to detecting any control codes that override any conditional usage level settings matched according to said particular proximity of said alternate mobile electronic device.

18. The system for conditionally controlling an electronic device according to claim 14, said system further comprising:
means for determining if any of said plurality of conditional usage level selections match according to said particular proximity of said alternate mobile electronic device and according to an identifier for said alternate mobile electronic device.

19. The system for conditionally controlling an electronic device according to claim 14, said system further comprising:
means for determining if any of said plurality of conditional usage level selections match according to said particular proximity of said alternate mobile electronic device and a current time.

20. The system for conditionally controlling an electronic device according to claim 14, said system further comprising:
means for comparing said particular proximity of said alternate mobile electronic device with said plurality of conditional usage level selections set by a manufacturer at said particular mobile electronic device.

21. The system for conditionally controlling an electronic device according to claim 14, said system further comprising:
means for comparing said particular proximity of said alternate mobile electronic device with said plurality of conditional usage level selections set by a user at said particular mobile electronic device.

22. The system for conditionally controlling an electronic device according to claim 14, said system further comprising:
means for comparing said particular proximity of said alternate mobile electronic device with said plurality of conditional usage level selections set by an authority to a user of said particular mobile electronic device.

23. The system for conditionally controlling an electronic device according to claim 13, said system further comprising:

means for receiving a control code at said particular mobile electronic device from said alternate mobile electronic device;

means for comparing said control code with said plurality of conditional usage level settings; and means for adjusting said level of usage of said particular mobile electronic device according to one of said plurality of conditional usage level settings that matches said control code.

24. The system for conditionally controlling an electronic device according to claim 13, said system further comprising:

means for transmitting a control code from said particular mobile electronic device to said alternate mobile electronic device, in response to adjusting said usage level of said particular mobile electronic devices according to one of said plurality of conditional usage level settings.

25. A program for conditionally controlling an electronic device, residing on a computer usable medium having computer readable program code means, said program comprising:

means for a particular mobile electronic device directly detecting signals transmitted by an alternate mobile electronic device within a particular proximity of the particular mobile electronic device, said means for detecting an alternate mobile electronic device further including:

means for detecting an identifier and global positioning location by receiving a signal directly from said alternate mobile electronic device at said particular mobile electronic device; and means for computing said particular proximity of said global positioning location of said alternate mobile electronic device to a current global positioning location of said particular mobile electronic device; and means, responsive to detection of said signals, for adjusting a level of usage of said particular mobile electronic device in response to determining a particular conditional usage level selection according to said particular proximity of said alternate mobile electronic device from among a plurality of conditional usage level selections at said particular mobile electronic device, such that said level of usage of said particular mobile electronic device is conditionally adjusted according to said particular proximity of said alternate mobile electronic device.

26. The program for conditionally controlling an electronic device according to claim 25, said means for adjusting a level of usage of said particular mobile electronic device in response to determining a particular conditional usage level selection according to said particular proximity of said alternate mobile electronic device, further comprising:

means for comparing said particular proximity of said alternate mobile electronic device with said plurality of conditional usage level selections at said particular mobile electronic device.

27. The program for conditionally controlling an electronic device according to claim 26, said program further comprising:

means for determining which of said detected at least one of said plurality of conditional usage level selections is rated with a highest priority, in response to detecting a match of at least one of said plurality of conditional usage level selections according to said particular proximity; and means for adjusting said level of usage of said particular mobile electronic device according to said conditional usage level selection rated with said highest priority.

28. The program for conditionally controlling an electronic device according to claim 26, said program further comprising:

means for adjusting said level of usage of said particular mobile electronic device according to said one of said plurality of conditional usage level selections, in response to detecting a match of one of said plurality of conditional usage level selections according to said particular proximity.

29. The program for conditionally controlling an electronic device according to claim 26, said program further comprising:

means for maintaining said usage level in response to detecting any control codes that override any conditional usage level settings matched according to said particular proximity of said alternate mobile electronic device.

30. The program for conditionally controlling an electronic device according to claim 26, said program further comprising:

means for determining if any of said plurality of conditional usage level selections match according to said particular proximity of said alternate mobile electronic device and according to an identifier for said alternate mobile electronic device.

31. The program for conditionally controlling an electronic device according to claim 26, said program further comprising:

means for determining if any of said plurality of conditional usage level selections match according to said particular proximity of said alternate mobile electronic device and a current time.

32. The program for conditionally controlling an electronic device according to claim 26, said program further comprising:

means for comparing said particular proximity of said alternate mobile electronic device with said plurality of conditional usage level selections set by a manufacturer at said particular mobile electronic device.

33. The program for conditionally controlling an electronic device according to claim 26, said program further comprising:

means for comparing said particular proximity of said alternate mobile electronic device with said plurality of conditional usage level selections set by a user at said particular mobile electronic device.

34. The program for conditionally controlling an electronic device according to claim 26, said program further comprising:

means for comparing said particular proximity of said alternate mobile electronic device with said plurality of conditional usage level selections set by an authority to a user of said particular mobile electronic device.

35. The program for conditionally controlling an electronic device according to claim 33, said program further comprising:

means for receiving a control code at said particular mobile electronic device from said alternate mobile electronic device;

means for comparing said control code with said plurality of conditional usage level settings; and means for adjusting said level of usage of said particular mobile electronic device according to one of said plurality of conditional usage level settings that matches said control code.

36. The program for conditionally controlling an electronic device according to claim 25, said program further comprising:
   means for transmitting a control code from said particular mobile electronic device to said alternate mobile electronic device, in response to adjusting said usage level of said particular mobile electronic devices according to one of said plurality of conditional usage level settings.

37. The method of claim 1, wherein said detecting signals comprises detecting one of infrared signals and ultrasound signals.

38. The system of claim 13, wherein said means for detecting signals comprises means for detecting one of infrared signals and ultrasound signals.

39. The program of claim 25, wherein said means for detecting signals comprises means for detecting one of infrared signals and ultrasound signals.

* * * * *